Nov. 1, 1927.
W. F. STIMPSON ET AL.
1,647,378
THERMOSTATIC ADJUSTING MECHANISM FOR SCALES
Filed June 8, 1925
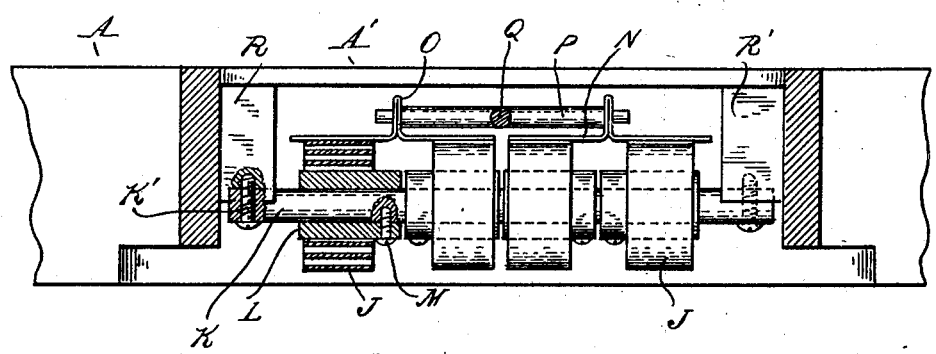
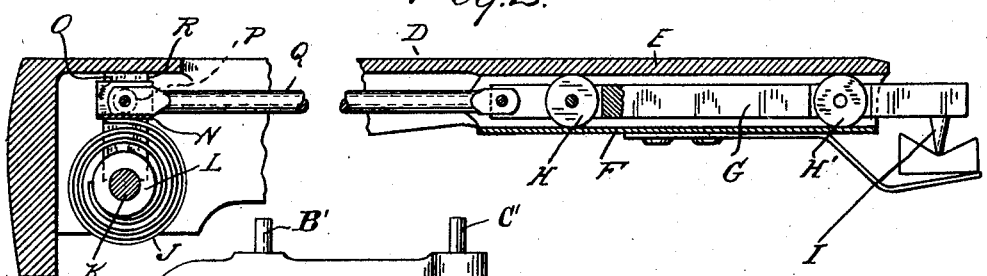
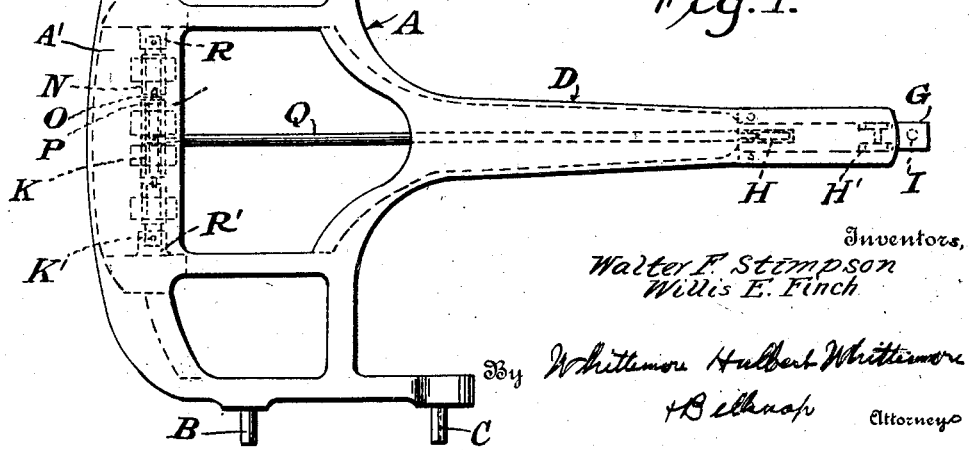
Inventors,
Walter F. Stimpson
Willis E. Finch
By Whittemore Hulbert Whittemore
& Belknap
Attorneys Patented Nov. 1, 1927.

1,647,378

UNITED STATES PATENT OFFICE.

WALTER F. STIMPSON AND WILLIS E. FINCH, OF LOUISVILLE, KENTUCKY; SAID FINCH ASSIGNOR TO SAID STIMPSON.

THERMOSTATIC ADJUSTING MECHANISM FOR SCALES.

Application filed June 8, 1925. Serial No. 35,765.

Our invention relates to thermostatic devices used in connection with weighing scales for the purpose of compensating for variations due to temperature changes. It is an object of the invention to obtain a construction which will fully compensate for all temperature changes within a large range of variations, further to obtain a construction which, when once set, requires no further attention, further to obtain a simple construction which is easily manufactured and installed in connection with weighing mechanism.

With these objects in view, the invention consists in the construction as hereinafter set forth.

In the drawings:—

Figure 1 is a plan view of a scale lever showing my improved thermostat applied thereto.

Figure 2 is a longitudinal section therethrough.

Figure 3 is a cross-section showing the construction of thermostat.

A is a scale lever of any suitable construction, but which, as shown, is designed as the main platform supporting lever of a weighing scale. B, B are the knife-edge fulcrum bearing pins and C, C are the knife-edge pivots for supporting the platform, not shown.

D is the long arm of the lever which is channel shaped in cross-section and is provided at its outer end with the parallel bearing plates E and F. Between these bearing plates is arranged a carriage G having rollers H and H' forming an anti-friction engagement with the bearing plates. At the outer end of the carriage is the pivot pin I for engaging with the steelyard rod or other connected scale member, not shown.

With the construction as thus described, the roller carriage is capable of comparatively frictionless movement over the parallel bearing plates E and F, thereby adjusting the position of the bearing pin I relative to the fulcrum bearings B. It is, however, necessary to provide thermostatically operated means for adjusting the carriage and of such a character that any expansion or contraction in the length of the lever arm D will be fully compensated for by a reverse movement of the carriage G. Weighing scales are frequently so located as to be subjected to a great variation in temperature, such for instance as 100° Fahr., and we have found that a considerable movement of the pivot is required for full compensation. To secure this required movement, we have devised a novel construction of thermostat, as follows:

J is a compensating metallic bar bent into a spiral form so as to obtain a considerable length within small space limits. A plurality of such coils are arranged in parallelism and are mounted on a common shaft K, preferably by providing each coil with a hub portion L which may be sleeved on said shaft and secured thereto by a set screw M. As specifically shown, we have employed four such coils arranged in pairs and their outer ends connected by yoke members N. The yokes N are provided with projecting ears O which are cross-connected by a shaft or pin P and centrally of these pins is connected the linkrod Q which extends through the channel arm D and is connected with the carriage G. The arrangement is such that the several coils co-act in adjusting the rod Q so as to avoid overloading any one coil and also to secure greater accuracy by averaging the movement of the several coils to minimize individual variations thereof. Furthermore, by this arrangement, each coil may be restricted in width, thereby avoiding any tendency to buckle laterally due to temperature changes as might be the case with a wider bar.

With the construction as described, to set the thermostat, the lever is placed in any suitable jig, not shown, for relatively locating the fulcrum pivots B and steelyard pivot I at some predetermined temperature, such as 70 degrees Fahr. The rod Q which is connected to the carriage G is then attached to the pin P and the shaft K on which the several coils of the thermostat are sleeved is mounted in recessed bearings R and R' on the cross bar A' of the lever A. As shown this bar A' is of angle cross section and the shaft K and coils J are concealed within the angle thereof. The shaft K is secured by screws K' after which set screws S engaging threaded apertures in the hubs L may be tightened to hold said hubs angularly fixed in relation to the shaft. After thus setting the device it may be removed from the jig and placed in the scale where any variation in temperature will bring about an adjustment of the rod Q and pivot I to compensate for elongation or contraction in the lever.

What we desire to claim is:

1. In a scale, a thermostat for compensating for temperature variations comprising a plurality of spirally coiled thermostatic bars, an equalizer connection between the outer end of said bars, a member to be actuated by said thermostat through said equalizer connection, and means for individually anchoring the inner ends of said thermostatic bars.

2. In a scale, a thermostat for compensating for temperature variations, comprising a plurality of spirally coiled thermostatic bars, a yoke connection between the outer ends of adjacent coils, an equalizer connection between a pair of yokes, a bearing actuated by said equalizer connection, and means for individually anchoring the inner ends of said coils.

3. In a scale, a thermostat for compensating the temperature variations, comprising a plurality of spirally coiled thermostatic bars, a hub connected to the inner end of each coil, a shaft on which said hubs are sleeved, set screws for adjustably securing said hubs to said shaft, an equalizer connection between the outer ends of said coils and a bearing adjusted by said equalizer connection.

4. In a scale, the combination with a lever having spaced fixed and movable bearings, of a thermostat for adjusting said movable bearings, comprising a plurality of spirally coiled thermostatic bars, a shaft on which said coils are mounted, spaced bearings on said lever for receiving said shaft with the coils therebetween, means for anchoring said shaft and the inner ends of the coils thereon, an equalizer connection between the outer ends of said coils and a connection between said equalizer connection and said movable bearing.

5. In a scale, a thermostat for compensating for temperature variations comprising a plurality of comparatively narrow spirally coiled thermostatic bars a connection through which said bars may operate in unison and means for individually anchoring said bars.

6. In a scale, a thermostat for compensating for temperature variations comprising a plurality of comparatively narrow spirally coiled thermostatic bars parallelly arranged, a member to be actuated operated conjointly by said bars and means for individually anchoring said bars.

In testimony whereof we affix our signatures.

WALTER F. STIMPSON.
WILLIS E. FINCH.